United States Patent
Ishizeki

(10) Patent No.: US 11,440,304 B2
(45) Date of Patent: Sep. 13, 2022

(54) LAMINATE AND ITS PRODUCTION METHOD

(71) Applicant: AGC Inc., Chiyoda-ku (JP)

(72) Inventor: Kenji Ishizeki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 283 days.

(21) Appl. No.: 16/775,339

(22) Filed: Jan. 29, 2020

(65) Prior Publication Data

US 2020/0164625 A1    May 28, 2020

Related U.S. Application Data

(63) Continuation of application No. PCT/JP2018/030228, filed on Aug. 13, 2018.

(30) Foreign Application Priority Data

Aug. 28, 2017  (JP) .............................. JP2017-163310

(51) Int. Cl.

| | |
|---|---|
| B32B 27/32 | (2006.01) |
| B05D 5/08 | (2006.01) |
| B32B 7/04 | (2019.01) |
| B32B 15/04 | (2006.01) |
| B32B 27/08 | (2006.01) |
| C08J 7/12 | (2006.01) |
| C08K 5/3492 | (2006.01) |
| C08K 5/544 | (2006.01) |
| B05D 7/00 | (2006.01) |
| B05D 3/04 | (2006.01) |
| C08J 7/06 | (2006.01) |
| C08J 7/04 | (2020.01) |
| B32B 37/26 | (2006.01) |
| C03C 17/34 | (2006.01) |
| C09K 3/18 | (2006.01) |
| C09D 7/63 | (2018.01) |
| C08K 5/02 | (2006.01) |

(52) U.S. Cl.
CPC ............ *B32B 27/322* (2013.01); *B05D 5/083* (2013.01); *B32B 7/04* (2013.01); *B32B 15/04* (2013.01); *B32B 27/08* (2013.01); *C08J 7/12* (2013.01); *C08K 5/3492* (2013.01); *B32B 2250/03* (2013.01); *B32B 2255/24* (2013.01); *B32B 2307/73* (2013.01); *B32B 2307/756* (2013.01); *B32B 2313/04* (2013.01); *B32B 2315/00* (2013.01); *B32B 2327/12* (2013.01); *B32B 2419/00* (2013.01); *B32B 2551/00* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 2012/0135252 A1 | 5/2012 | Kishikawa et al. | |
| 2017/0050940 A1 | 2/2017 | Ito et al. | |
| 2021/0172072 A1* | 6/2021 | Otani | F28F 21/084 |

FOREIGN PATENT DOCUMENTS

| | | | |
|---|---|---|---|
| CN | 102471669 A | | 5/2012 |
| CN | 106029819 A | | 10/2016 |
| JP | 2005186577 A | * | 7/2005 |
| JP | 2016-60792 A | | 4/2016 |

OTHER PUBLICATIONS

Machine translation of JP 2005-186577A (Year: 2005).*
International Search Report dated Nov. 6, 2018 in PCT/JP2018/030228 filed Aug. 13, 2018, citing document AO therein, 1 page.

* cited by examiner

*Primary Examiner* — Ramsey Zacharia
(74) *Attorney, Agent, or Firm* — Oblon, McClelland, Maier & Neustadt, L.L.P.

(57) ABSTRACT

To provide a laminate having a surface layer with a small water sliding angle.
A laminate comprising a substrate, an interlayer formed on the substrate, and a surface layer formed on the interlayer, wherein the interlayer is a layer formed by using a triazine compound having at least one of a M-OH group (wherein M is a metal atom or a silicon atom) and a group capable of forming the M-OH group, at least one of an amino group and a mercapto group, and a triazine ring, and the surface layer is a layer formed by using a fluorinated ether compound having a poly(oxyperfluoroalkylene) chain, and at least one of a hydrolyzable group bonded to a silicon atom and a hydroxy group bonded to a silicon atom.

8 Claims, No Drawings

LAMINATE AND ITS PRODUCTION METHOD

This application is a continuation of PCT Application No. PCT/JP2018/030228, filed on Aug. 13, 2018, which is based upon and claims the benefit of priority from Japanese Patent Application No. 2017-163310 filed on Aug. 28, 2017. The contents of those applications are incorporated herein by reference in their entireties.

TECHNICAL FIELD

The present invention relates to a laminate and its production method.

BACKGROUND ART

Fluorinated compounds, which have high lubricity, water/oil repellency, etc., are suitably used for a surface treatment agent. A surface treatment agent imparts water/oil repellency to the surface of a substrate, whereby stains on the surface of the substrate will be easily wiped off, and the stain removability will improve. Among the fluorinated compounds, fluorinated ether compounds having a poly(oxyperfluoroalkylene) chain in which an ether bond (—O—) is present in the middle of a perfluoroalkylene group are compounds excellent in flexibility and are particularly excellent in removability of oil stains, etc.

In recent years, application of the fluorinated ether compounds to various substrates has been attempted, and Patent Document 1 discloses a sapphire substrate having a surface layer formed of the fluorinated ether compound.

PRIOR ART DOCUMENTS

Patent Documents

Patent Document 1: JP-A-2016-060792

DISCLOSURE OF INVENTION

Technical Problem

In recent years, further improvement of the fingerprint removability on a surface layer obtained by using a surface treatment agent has been desired.

Heretofore, it has been considered to form a surface layer having a large water contact angle, such as a surface layer formed by using the fluorinated ether compound, so as to improve the fingerprint removability. However, it was found that the fingerprint removability of a surface layer formed on the surface of a substrate using the fluorinated ether compound as disclosed in Patent Document 1, should further be improved.

The present inventor has conducted extensive studies on such a problem and found that the fingerprint removability may sometimes be insufficient if the sliding angle for water (hereinafter sometimes referred to as "water sliding angle") is large, even if the water contact angle of the surface layer is large.

Under these circumstances, the object of the present invention is to provide a laminate having a surface layer with a small water sliding angle, and its production method.

Solution to Problem

The present invention provides a laminate having the following constitutions [1] to [10], and a method for producing a laminate having the following constitutions [11] to [14].

[1] A laminate comprising a substrate, an interlayer formed on the substrate, and a surface layer formed on the interlayer,
wherein the interlayer is a layer formed by using a triazine compound having at least one of a M-OH group (wherein M is a metal atom or a silicon atom) and a group capable of forming the M-OH group, at least one of an amino group and a mercapto group, and a triazine ring, and
the surface layer is a layer formed by using a fluorinated ether compound having a poly(oxyperfluoroalkylene) chain, and at least one of a hydrolyzable group bonded to a silicon atom and a hydroxy group bonded to a silicon atom.

[2] The laminate according to [1], wherein the triazine compound has a group capable of forming the M-OH group, and the group capable of forming the M-OH group is a hydrolyzable silyl group.

[3] The laminate according to [1] or [2], wherein the triazine compound has an amino group.

[4] The laminate according to [3], wherein the triazine compound is a compound represented by the following formula TN-1 or TN-2:

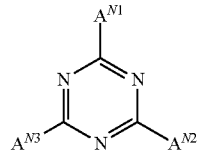

Formula TN-1

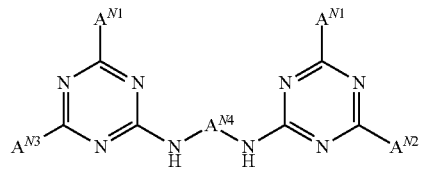

Formula TN-2 wherein $A^{N1}$ is $-N(R^{N1})-R^{N2}-Si(R^{N3})_{Nn}(OR^{N4})_{3-Nn}$ or $-N\{R^{N2}-Si(R^{N3})_{Nn}(OR^{N4})_{3-Nn}\}_2$,
$A^{N2}$ is $-N(R^{N5})-R^{N6}(NH_2)_{Nm}$ or $-N\{R^{N6}(NH_2)_{Nm}\}_2$,
$A^{N3}$ is $A^{N1}$, $A^{N2}$ or $-N(R^{N7})-R^{N8}$,
$A^{N4}$ is a bivalent linking group,
$R^{N1}$, $R^{N5}$ and $R^{N7}$ are each independently a hydrogen atom or a monovalent hydrocarbon group,
$R^{N2}$ is a bivalent linking group,
$R^{N3}$ and $R^{N8}$ are each independently a monovalent hydrocarbon group,
$R^{N4}$ is a hydrogen atom or a monovalent hydrocarbon group,
$R^{N6}$ is a (Nm+1) valent linking group,
Nn is an integer of from 0 to 2, and Nm is 1 or 2.

[5] The laminate according to [1] or [2], wherein the triazine compound has a mercapto group.

[6] The laminate according to [5], wherein the triazine compound is a compound represented by the following formula TS:

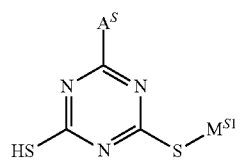

Formula TS wherein $A^S$ is $-N(R^{S4})-R^{S1}-Si(R^{S2})_{Sn}(OR^{S3})_{3-Sn}$ or $-N\{R^{S1}-Si(R^{S2})_{Sn}(OR^{S3})_{3-Sn}\}_2$, $R^{S1}$ is a single bond or a bivalent linking group,
$R^{S2}$ is a monovalent hydrocarbon group,
$R^{S3}$ and $R^{S4}$ are each independently a hydrogen atom or a monovalent hydrocarbon group,
$M^{S1}$ is a hydrogen atom or an alkali metal atom, and
Sn is an integer of from 0 to 2.

[7] The laminate according to any one of [1] to [6], wherein the fluorinated ether compound is represented by the following formula 1:

$$[A-O-Z^1-(R^fO)_m-]_jZ^2[-SiR_nL_{3-n}]_q \quad \text{Formula 1}$$

wherein A is a perfluoroalkyl group or $-Q[-SiR_nL_{3-n}]_k$,
Q is a (k+1) valent linking group,
k is an integer of from 1 to 10,
R is a monovalent hydrocarbon group,
L is a hydrolyzable group or a hydroxy group,
n is an integer of from 0 to 2,
$Z^1$ is a single bond, a $C_{1-20}$ oxyfluoroalkylene group having at least one hydrogen atom substituted by a fluorine atom, or a $C_{1-20}$ poly(oxyfluoroalkylene) group having at least one hydrogen atom substituted by a fluorine atom,
$R^f$ is a perfluoroalkylene group,
m is an integer of from 2 to 200,
$Z^2$ is a (j+q) valent linking group, and
j and q are each independently an integer of at least 1.

[8] The laminate according to [7], wherein A is a perfluoroalkyl group.

[9] The laminate according to any one of [1] to [8], wherein the substrate has, on the outermost surface on the interlayer side, a sapphire layer, a metal layer, a metal oxide layer, a diamond-like carbon layer or a resin layer.

[10] The laminate according to any one of [1] to [9], which is used for an article for an electronic device, an article for a transport device, an article for a precision device, an article for an optical device or an article for building.

[11] A method for producing a laminate comprising a substrate, an interlayer formed on the substrate, and a surface layer formed on the interlayer,
which comprises forming on the substrate the interlayer by dry coating method or wet coating method using a triazine compound having at least one of a M-OH group (wherein M is a metal atom or a silicon atom) and a group capable of forming the M-OH group, at least one of an amino group and a mercapto group, and a triazine ring, and
forming on the interlayer the surface layer by dry coating method or wet coating method using a fluorinated ether compound having a poly(oxyperfluoroalkylene) chain, and at least one of a hydrolyzable group bonded to a silicon atom and a hydroxy group bonded to a silicon atom.

[12] The method according to [11], wherein the dry coating method is vacuum deposition method.

[13] The method according to [11], wherein the method of forming the interlayer by wet coating method is a method of forming the interlayer by using a composition containing the triazine compound and a liquid medium, applying the composition on the substrate, and removing the liquid medium from the formed coating film containing the liquid medium, and
the method of forming the surface layer by wet coating method is a method of forming the surface layer by using a composition containing the fluorinated ether compound and a liquid medium, applying the composition on the interlayer, and removing the liquid medium from the formed coating film containing the liquid medium.

[14] The method according to any one of [11] to [13], wherein the triazine compound is a triazine compound having a hydrolyzable silyl group, an amino group or a mercapto group, and a triazine ring.

Advantageous Effects of Invention

According to the present invention, a laminate having a surface layer with a small water sliding angle can be provided.

DESCRIPTION OF EMBODIMENTS

In this specification, a compound represented by the formula 1 will be referred to as compound 1. Compounds represented by other formulae will be referred to in the same manner. A group represented by the formula 1 will be referred to as group 1. Groups represented by other formulae will be referred to in the same manner.

In this specification, the expressions "an alkylene group may have group A" and "an alkylene group which may have group A" mean that the alkylene group may have group A between carbon atoms in the alkylene group, or may have group A at the terminal, that is, the alkylene group-group A-.

Meanings of terms in the present invention are as follows.

An "etheric oxygen atom" means an oxygen atom forming an ether bond (—O—) between carbon atoms.

A "bivalent organopolysiloxane residue" is a group represented by the following formula. In the following formula, $R^a$ is an alkyl group (preferably $C_{1-10}$), or a phenyl group. g1 is an integer of at least 1, preferably an integer of from 1 to 9, particularly preferably an integer of from 1 to 4.

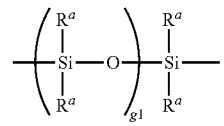

A "silphenylene skeleton group" is a group represented by $-Si(R^b)_2PhSi(R^b)_2-$ (wherein Ph is a phenylene group, and $R^b$ is a monovalent organic group). $R^b$ is preferably an alkyl group (preferably $C_{1-10}$).

A "dialkylsilylene group" is a group represented by $-Si(R^c)_2-$ (wherein $R^c$ is an alkyl group (preferably $C_{1-10}$)).

A "surface layer" means a layer formed on the surface of a substrate.

The "number average molecular weight" of the fluorinated ether compound is calculated in accordance with the following method by means of NMR analysis.

It is calculated by obtaining the number (average value) of oxyperfluoroalkylene groups on the basis of the terminal group, by $^1$H-NMR and $^{19}$F-NMR.

The laminate of the present invention is a laminate comprising a substrate, an interlayer formed on the substrate, and a surface layer formed on the interlayer, wherein the interlayer is a layer formed by using a triazine compound (hereinafter sometimes referred to as "specific triazine compound") having at least one of a M-OH group and a group capable of forming the M-OH group, at least one of an amino group and a mercapto group, and a triazine ring, and the surface layer is a layer formed by using a fluorinated ether compound having a poly(oxyperfluoroalkylene) chain, and at least one of a hydrolyzable group bonded to a silicon atom and a hydroxy group bonded to a silicon atom.

The laminate of the present invention has a surface layer with a small water sliding angle. The mechanism has not been clearly understood in detail, but is estimated substantially as follows.

In order to improve the fingerprint removability, a method has been known in which a surface layer is formed by using a fluorinated ether compound on the surface of a substrate to increase the water contact angle. However, the present inventor has found that the fingerprint removability may sometimes be still insufficient even if a surface layer with a large water contact angle is used.

The present inventor has conducted studies to solvent the problem and as a result, found that the fingerprint removability will improve when the water sliding angle of the surface layer is small.

That is, it has been considered that there is a certain correlation between the water sliding angle and the water contact angle, and specifically, the water sliding angle is small when the water contact angle is large. However, such a relation is not necessarily satisfied, and there may be a case where the water sliding angle is large even when the water contact angle is large. The reason is estimated to be such that a poly(oxyperfluoroalkylene) chain contained in the fluorinated ether compound is not sufficiently introduced to the substrate.

Accordingly, the present inventor has formed an interlayer using a specific triazine compound on a substrate and formed a surface layer by using a fluorinated ether compound on the interlayer, and found that the water sliding angle of the surface layer became small. The reason is estimated to be such that the poly(oxyperfluoroalkylene) chain is well introduced to the surface of the laminate, and as a result, a laminate excellent in fingerprint removability was obtained.

[Substrate]

The substrate is not particularly limited so long as it is desired to have water/oil repellency imparted.

The substrate preferably has, on the outermost surface on the interlayer side, a sapphire layer, a metal layer, a metal oxide layer, a diamond-like carbon layer, a resin layer, a glass layer, a ceramic layer, a layer containing stones, or a layer comprising a composite material thereof. Among them, more preferred is a sapphire layer, a metal layer, a metal oxide layer, a diamond-like carbon layer or a resin layer, whereby the effects of the present invention will be more remarkably obtained.

The substrate may be constituted only by the above layer, or may be constituted by a plurality of layers including the above layer located on the outermost surface.

The sapphire layer may be a layer consisting solely of sapphire, or may be a layer containing sapphire and a component (such as $SiO_2$) other than sapphire.

The material constituting the metal layer may, for example, be specifically ion, stainless steel (SUS), aluminum, chromium, copper, zinc, titanium or an alloy thereof (such as brass).

The material constituting the metal oxide layer may, for example, be specifically an oxide of the above metal.

The diamond-like carbon layer means a film having an amorphous structure in which both diamond bond (a bond by $sp^3$ hybrid orbitals of carbon atoms) and a graphite bond (a bond by $sp^2$ hybrid orbitals of carbon atoms) coexist. Diamond-like carbon may contain atoms other than carbon atoms (for example, hydrogen atoms, oxygen atoms, silicon atoms, nitrogen atoms, aluminum, boron atoms or phosphorus atoms).

The material constituting the resin layer may, for example, be specifically a polyester resin (for example, polyethylene terephthalate or polybutylene terephthalate), a polyolefin resin (for example, polyethylene or polypropylene), an ethylene/vinyl acetate copolymer, a vinyl acetate resin, a norbornene resin, an acrylic resin, a methacrylic resin, a urethane resin, a polyarylate resin, an acrylic urethane resin, a vinyl chloride resin, a vinylidene chloride resin, a fluororesin, a polycarbonate resin, a polyvinyl butyral resin, a polyvinyl alcohol resin, a polymethacrylic imide resin, a polystyrene resin, an ABS resin, a MS (methyl methacrylate/styrene) resin or an epoxy resin. Among them, preferred is an acrylic resin or a methacrylic resin.

The resin layer is preferably a hard coat layer formed by curing a curable resin composition (preferably an active energy ray-curable resin composition) containing the above resin. In this specification, a hard coat layer means a resin layer of which a haze change is at most 30% after rotated 100 revolutions under a load of 500 g in Taber abrasion test as specified by JIS K7204.

In order to further improve the adhesion between the substrate and the interlayer, an activation treatment (for example, dry activation treatment or wet activation treatment) may be applied to the surface of the substrate.

The dry activation treatment may, for example, be specifically a treatment of applying active energy rays (such as ultraviolet rays, electron beams or X-rays) to the surface of the substrate, corona discharge treatment, vacuum plasma treatment, ordinary pressure plasma treatment, flame treatment or itro treatment.

The wet activation treatment may, for example, be specifically a treatment to bring the surface layer into contact with an acid or alkali solution.

Among the above activation treatments, corona discharge treatment is preferred, whereby the adhesion between the substrate and the interlayer will more improve.

[Interlayer]

The interlayer is a layer formed by using a specific triazine compound, and is excellent in adhesion to various substrates.

The reason has not been clearly understood but is estimated as follows. A specific triazine compound has, as described hereinafter, at least one of a M-OH group and a group capable of forming the M-OH group, and has at least one of an amino group and a mercapto group, and has the above effect by the action of such groups.

The specific triazine compound may be used alone or in combination of two or more.

The interlayer may contain a component other than the triazine compound.

The thickness of the interlayer is preferably the monomolecular thickness of the specific triazine compound. Specifically, the thickness of the interlayer is preferably from 1 to 20 nm, particularly preferably from 3 to 10 nm. When the thickness of the interlayer is within the above range, the adhesion between the interlayer and the surface layer will be excellent, and the water sliding angle of the surface layer can be made smaller.

The thickness of the interlayer can be calculated from an oscillation period of an interference pattern of reflected X-ray, obtained by X-ray reflectance method using an X-ray diffractometer for thin film analysis (ATX-G, trade name, manufactured by Rigaku Corporation).

(Specific Triazine Compound)

M is preferably Si, Al or Ti, particularly preferably Si.

The group capable of forming the M-OH group may, for example, be a group having a hydrolyzable group bonded to M, and is preferably a hydrolyzable silyl group.

The hydrolyzable silyl group in the specific triazine compound is a group having a hydrolyzable group bonded to the silicon atom, and the hydrolyzable group may, for example, be an alkoxy group, a halogen atom, an acyl group, an acyloxy group or an isocyanate group (—NCO). The alkoxy group is preferably a $C_{1-6}$ alkoxy group. The halogen atom is preferably a chlorine atom.

The hydrolyzable group is preferably a $C_{1-6}$ alkoxy group or a halogen atom in view of easy industrial production. The hydrolyzable group is, since outgassing during formation of the interlayer will be less, and storage stability of the compound will be more excellent, preferably a $C_{1-6}$ alkoxy group, and in a case where long term storage stability of the compound is required, particularly preferably an ethoxy group, and in a case where the reaction time at the time of formation of the interlayer should be short, particularly preferably a methoxy group.

The hydrolyzable silyl group in the specific triazine compound is preferably bonded to a nitrogen atom bonded to the carbon atom of the triazine ring via a bivalent linking group. The bivalent linking group is preferably a bivalent hydrocarbon group. To the nitrogen atom bonded to the carbon atom of the triazine ring, one hydrolyzable silyl group may be bonded via a bivalent linking group, or two hydrolyzable silyl groups may be bonded respectively via a bivalent linking group.

The hydrolyzable silyl group in the specific triazine compound is, in compounds represented by the after-described formulae TN-1 and TN-2, a group represented by —Si$(R^{N3})_{Nn}(OR^{N4})_{3-Nn}$ (wherein $R^{N4}$ is a monovalent hydrocarbon group), and in a compound represented by the after-described formula TS, a group represented by —Si$(R^{S2})_{Sn}(OR^{S3})_{3-Sn}$ (wherein $R^{S3}$ is a monovalent hydrocarbon group). As mentioned above, the monovalent hydrocarbon group as $R^{N4}$ and the monovalent hydrocarbon group as $R^3$ are each independently preferably a $C_{1-6}$ alkyl group.

In the specific triazine compound, each of the amino group and the mercapto group is preferably bonded to the carbon atom constituting the triazine ring directly or via a linking group. When the specific triazine compound has an amino group, the amino group is preferably bonded to the carbon atom constituting the triazine ring via a linking group. When the specific triazine compound has a mercapto group, the mercapto group is preferably bonded directly to the carbon atom constituting the triazine ring.

The specific triazine compound preferably has an amino group, in view of particularly excellent adhesion between the interlayer and the surface layer.

(Triazine Compound having Amino Group)

As the triazine compound having an amino group, compound TN-1 and compound TN-2 are preferred.

Formula TN-1

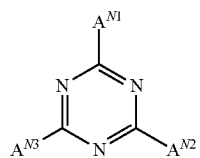

Formula TN-2

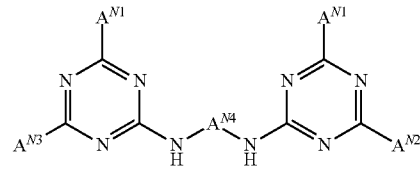

The symbols in the formulae TN-1 and TN-2 have the following meanings.

$A^{N1}$ is —N$(R^{N1})$—$R^{N2}$—Si$(R^{N3})_{Nn}(OR^{N4})_{3-Nn}$ or —N{$R^{N2}$—Si$(R^{N3})_{Nn}(OR^{N4})_{3-Nn}$}$_2$.
$A^{N2}$ is —N$(R^{N5})$—$R^{N6}(NH_2)_{Nm}$ or —N{$R^{N6}(NH_2)_{Nm}$}$_2$.
$A^{N3}$ is $A^{N1}$, $A^{N2}$ or —N$(R^{N7})$—$R^{N8}$.
$A^{N4}$ is a bivalent linking group.
$R^{N1}$, $R^{N5}$ and $R^{N7}$ are each independently a hydrogen atom or a monovalent hydrocarbon group.
$R^{N2}$ is a bivalent linking group.
$R^{N3}$ and $R^{N8}$ are each independently a monovalent hydrocarbon group.
$R^{N4}$ is a hydrogen atom or a monovalent hydrocarbon group.
$R^{N6}$ is a (Nm+1) valent linking group.
Nn is an integer of from 0 to 2, and Nm is 1 or 2.

In a case where there are a plurality of each of $R^{N1}$, $R^{N2}$, $R^{N3}$, $R^{N4}$, $R^{N5}$ and $R^{N6}$, the plurality of each of $R^{N1}$, $R^{N2}$, $R^{N3}$, $R^{N4}$, $R^{N5}$ and $R^{N6}$ may be the same or different.

The monovalent hydrocarbon group as each of $R^{N1}$, $R^{N3}$, $R^{N4}$, $R^{N5}$, $R^{N7}$ and $R^{N8}$ is preferably a monovalent aliphatic hydrocarbon group (which may be saturated or may be unsaturated) or a monovalent aromatic hydrocarbon group, more preferably a monovalent aliphatic hydrocarbon group, particularly preferably an alkyl group.

The monovalent hydrocarbon group may be linear, may be branched or may have a cyclic structure.

The monovalent hydrocarbon group may have at least one group selected from the group consisting of —S—, —O—, —NHCO—, —N< and —NH—.

The number of carbon atoms in the monovalent hydrocarbon group as each of $R^{N1}$, $R^{N5}$, $R^{N7}$ and $R^{N8}$ is preferably from 1 to 12. The number of carbon atoms in the monovalent hydrocarbon group as each of $R^{N3}$ and $R^{N4}$ is preferably from 1 to 6.

The bivalent linking group as each of $A^{N4}$ and $R^{N2}$ is preferably a bivalent hydrocarbon group, more preferably a bivalent aliphatic hydrocarbon group (which may be saturated or may be unsaturated) or a bivalent aromatic hydrocarbon group, further preferably a bivalent aliphatic hydrocarbon group, particularly preferably an alkylene group.

The bivalent hydrocarbon group may be linear, may be branched or may have a cyclic structure.

The number of carbon atoms in the bivalent hydrocarbon group is preferably from 1 to 12.

The bivalent hydrocarbon group may have at least one group selected from the group consisting of —S—, —O—, —NHCO—, —N< and —NH—.

The (Nm+1) valent linking group as $R^{N6}$ is preferably a (Nm+1) valent hydrocarbon group, more preferably a (Nm+1) valent aliphatic hydrocarbon group (which may be saturated or may be unsaturated) or a (Nm+1) valent aromatic hydrocarbon group, particularly preferably a (Nm+1) valent aliphatic hydrocarbon group.

The bivalent hydrocarbon group may be linear, may be branched or may have a cyclic structure.

The number of carbon atoms in the bivalent hydrocarbon group is preferably from 1 to 12.

The bivalent hydrocarbon group may have at least one group selected from the group consisting of —S—, —O—, —NHCO—, —N< and —NH—.

As described above, Nm is 1 or 2. Accordingly, $R^{N6}$ is a bivalent or trivalent linking group, and is preferably a bivalent linking group. The preferred embodiment of the bivalent linking group is the same as the bivalent linking group as $A^{N4}$ and $R^{N2}$.

Specific examples of $A^{N1}$ are as follows. In the formulae, r1 is an integer of at least 1, and r2 is an integer of at least 0.

—NH—$(CH_2)_{r1}$—Si{O$(CH_2)_{r2}(CH_3)$}$_3$
—N[$(CH_2)_{r1}$—Si{O$(CH_2)_{r2}(CH_3)$}]$_3$
—NH—$(CH_2)_{r1}$—Si$(CH_3)${O$(CH_2)_{r2}(CH_3)$}$_2$
—NH—$C_6H_4$O$(CH_2)_{r1}$—Si{O$(CH_2)_{r2}(CH_3)$}$_3$

Specific examples of $A^{N2}$ are as follows. In the formulae, r1 is an integer of at least 1.

—NH—$(CH_2)_{r1}(NH_2)$
—N{$(CH_2)_{r1}(NH_2)$}$_2$

Specific examples of $A^{N3}$ are as follows. In the formulae, r1 is an integer of at least 1, and r2 is an integer of at least 0.

—NH—$(CH_2)_{r1}$—Si{O$(CH_2)_{r2}(CH_3)$}$_3$
—N[$(CH_2)_{r1}$—Si{O$(CH_2)_{r2}(CH_3)$}]$_3$
—NH—$(CH_2)_{r1}$—Si$(CH_3)${O$(CH_2)_{r2}(CH_3)$}$_2$
—NH—$C_6H_4$O$(CH_2)_{r1}$—Si{O$(CH_2)_{r2}(CH_3)$}$_3$
—NH—$(CH_2)_{r1}(NH_2)$
—N{$(CH_2)_{r1}(NH_2)$}$_2$

A specific example of $A^{N4}$ is as follows. In the formula, r1 is an integer of at least 1.

—$(CH_2)_{r1}$— r1 is preferably from 1 to 6, and r2 is preferably from 0 to 5.

As specific examples of the triazine compound having an amino group, the triazine compound having an amino group corresponding to the formula TN-1 or TN-2 may, for example, be N,N'-bis(2-aminoethyl)-6-(3-triethoxysilylpropyl)amino-1,3,5-triazine-2,4-diamine, 6-(3-triethoxysilylpropyl)amino-2,4-dihydrazinyl-1,3,5-triazine, 2-(N,N'-di-3-triethoxysilylpropyl)amino-4,6-di(2-aminoethyl)amino-1,3,5-triazine, 2-(2-aminoethyl)amino-4,6-di(3-triethoxysilylpropyl)amino-1,3,5-triazine, 6-(2-aminoethyl)amino-2,4-di(triisopropoxysilyl)propylamino-1,3,5-triazine, 6-(2-aminoethyl)amino-2,4-di(triisopropenoxysilyl)propylamino-1,3,5-triazine, 6-(2-aminoethyl)amino-2,4-di(triisopropoxysilyl)propylamino-1,3,5-triazine, 6-(2-aminoethyl)amino-2,4-di(tribenzoxysilyl)propylamino-1,3,5-triazine, 6-(2-aminoethyl)amino-2,4-bis(triethoxysilylhexyl)amino-1,3,5-triazine, 6-(2-aminoethyl)amino-2,4-bis(triethoxysilyldodecyl)amino-1,3,5-triazine, 2,4-di(2-aminoethyl)amino-6-di(triisopropoxysilyl)propylamino-1,3,5-triazine, 2,4-di(2-aminoethyl)amino-6-di(triisopropenoxysilyl)propylamino-1,3,5-triazine, 2,4-di(2-aminoethyl)amino-6-di(tribenzoxysilyl)propylamino-1,3,5-triazine, 2,4-di(2-aminoethyl)amino-6-bis(triethoxysilylhexylamino)-1,3,5-triazine, 2,4-di(2-aminoethyl)amino-6-bis(triethoxysilylpropyl)amino-1,3,5-triazine, N,N'-bis(2-dimethylaminoethyl)-6-(3-triethoxysilylpropyl)amino-1,3,5-triazine-2,4-diamine, N,N'-bis(2-aminohexyl)-6-(3-triethoxysilylpropyl)amino-1,3,5-triazine-2,4-diamine, N,N'-bis{2-[bis-(2-aminoethyl)amino]ethyl}-6-(3-triethoxysilylpropyl)amino-1,3,5-triazine-2,4-diamine or N,N'-bis(12-aminododecyl)-6-(3-triethoxysilylpropyl)amino-1,3,5-triazine-2,4-diamine.

The triazine compound having an amino group not corresponding to either of the formulae TN-1 and TN-2 may be 6-(2-aminoethyl)amino-2,4-bis(methylethylketoximinosilyl)propylamino-1,3,5-triazine, 6-(2-aminoethyl)amino-2,4-di(triacetoxysilyl)propylamino-1,3,5-triazine, 2,4-di(2-aminoethyl)amino-6-bis(methylethylketoximinosilyl)propylamino-1,3,5-triazine or 2,4-di(2-aminoethyl)amino-6-di(triacetoxysilyl)propylamino-1,3,5-triazine.

Among such specific examples, preferred is a triazine compound having an amino group represented by the formula TN-1 or TN-2.

(Triazine Compound Having Mercapto Group)

As the triazine compound having a mercapto group, preferred is compound TS, in view of excellent water sliding angle of the resulting surface layer.

Formula TS

The symbols in the formula TS have the following meanings.

$A^S$ is —N($R^{S4}$)—$R^{S1}$—Si($R^{S2}$)$_{Sn}$(O$R^{S3}$)$_{3-Sn}$ or —N{$R^{S1}$—Si($R^{S2}$)$_{Sn}$(O$R^{S3}$)$_{3-Sn}$}$_2$.

$R^{S1}$ is a single bond or a bivalent linking group.

The bivalent linking group as $R^{S1}$ is preferably a bivalent hydrocarbon group, particularly preferably a bivalent aliphatic hydrocarbon group (which may be saturated or may be unsaturated) or a bivalent aromatic hydrocarbon group.

The bivalent hydrocarbon group may be linear, may be branched or may have a cyclic structure.

The number of carbon atoms in the bivalent hydrocarbon group is preferably from 1 to 20, more preferably from 1 to 12, particularly preferably from 2 to 8.

The bivalent hydrocarbon group may have at least one group selected from the group consisting of —NH—, —C(O)—, —O—, —S— and —C(O)O—.

As specific examples of $R^{S1}$, —$CH_2CH_2$—, —$CH_2CH_2CH_2$—, —$CH_2CH_2CH_2CH_2CH_2CH_2$—, —$CH_2CH_2SCH_2CH_2$—, —$CH_2CH_2CH_2SCH_2CH_2CH_2$—, —$CH_2CH_2NHCH_2CH_2CH_2$—, —$(CH_2CH_2)_2NCH_2CH_2CH_2$—, —$C_6H_4$—, —$C_6H_4C_6H_4$—, —$CH_2C_6H_4CH_2$—, —$CH_2CH_2CH_2CH_2CH_2CH_2CH_2CH_2CH_2$—, —$CH_2CH_2OCONHCH_2CH_2CH_2$—, —$CH_2CH_2NHCONHCH_2CH_2CH_2$—, —$(CH_2CH_2)_2CHOCONHCH_2CH_2CH_2$— may be mentioned.

In a case where there are a plurality of $R^{S1}$, the plurality of $R^{S1}$ may be the same or different.

$R^{S2}$ is a monovalent hydrocarbon group.

$R^{S3}$ is a hydrogen atom or a monovalent hydrocarbon group.

The monovalent hydrocarbon group as each of $R^{S2}$ and $R^{S3}$ is preferably a monovalent aliphatic hydrocarbon group (which may be saturated or may be unsaturated) or a monovalent aromatic hydrocarbon group, more preferably a monovalent aliphatic hydrocarbon group, particularly preferably an alkyl group.

The monovalent hydrocarbon group may be linear, may be branched or may have a cyclic structure.

The monovalent hydrocarbon group may have a substituent.

In a case where each of $R^{S2}$ and $R^{S3}$ is a monovalent hydrocarbon group, its number of carbon atoms is preferably 1 to 10, particularly preferably from 1 to 6.

In a case where $R^{S2}$ and $R^{S3}$ are a monovalent hydrocarbon group, as specific examples, $CH_3$—, $C_2H_5$—, n-$C_3H_7$—, n-$C_4H_9$—, i-$C_4H_9$— and t-$C_4H_9$— may be mentioned.

In a case where there are a plurality of $R^{S2}$, the plurality of $R^{S2}$ may be the same or different. In a case where there are a plurality of $R^{S3}$, the plurality of $R^{S3}$ may be the same or different.

$R^{S4}$ is a hydrogen atom or a monovalent hydrocarbon group.

The monovalent hydrocarbon group is preferably a monovalent aliphatic hydrocarbon group (which may be saturated or may be unsaturated) or a monovalent aromatic hydrocarbon group. The monovalent hydrocarbon group may be linear, may be branched or may have a cyclic structure.

The number of carbon atoms in the monovalent hydrocarbon group is preferably from 1 to 20, particularly preferably from 2 to 8.

The monovalent hydrocarbon group may have a substituent.

In a case where $R^{S4}$ is a monovalent hydrocarbon group, as specific examples, $CH_3$—, $C_2H_5$—, n-$C_3H_7$—, $CH_2$=$CHCH_2$—, n-$C_4H_9$—, $C_6H_5$— and $C_6H_{11}$— may be mentioned.

$M^{S1}$ is a hydrogen atom or an alkali metal atom, and is preferably a hydrogen atom, Li, Na, K or Cs.

Sn is an integer of from 0 to 2.

As specific examples of the triazine compound having a mercapto group, 6-(3-(triethoxysilyl)propylamino)-1,3,5-triazine-2,4-dithiol-monosodium (TES), 6-(3-(triethoxysilyl)propylamino)-1,3,5-triazine-2,4-dithiol, 6-(3-(monomethyldiethoxysilyl)propylamino)-1,3,5-triazine-2,4-dithiol-monosodium (DES), 6-(3-(dimethylmonoethoxysilyl)propylamino)-1,3,5-triazine-2,4-dithiol-monosodium (MES), 6-di-(3-triethoxysilylpropylamino)-1,3,5-triazine-2,4-dithiol-monosodium (BTES), 6-N-cyclohexyl-N-(3-(triethoxysilyl)propylamino)-1,3,5-triazine-2,4-dithiol-monosodium, 6-N-benzyl-N-(3-(monomethyldiethoxysilyl)propylam ino)-1,3,5-triazine-2,4-dithiol-monosodium may be mentioned.

[Surface Layer]

The surface layer is a layer formed by using the fluorinated ether compound. The fluorinated ether compound may be used alone or in combination of two or more.

The surface layer may contain a component other than the fluorinated ether compound.

The thickness of the surface layer is preferably from 1 to 100 nm, particularly preferably from 1 to 50 nm. The thickness of the surface layer may be measured in the same manner as the thickness of the interlayer.

The water sliding angle of the surface layer is preferably at most 20 degrees, more preferably at most 18 degrees, particularly preferably at most 16 degrees. When the water sliding angle is at most 20 degrees, the fingerprint removability of the surface layer will further improve. The water sliding angle of the surface layer is preferably as small as possible, and accordingly the lower limit value is not particularly limited. The water sliding angle may be measured by a sliding angle measuring apparatus (SA-11, trade name, manufactured by Kyowa Interface Science, Inc.).

The water contact angle of the surface layer is preferably at least 100 degrees, more preferably at least 110 degrees, particularly preferably at least 115 degrees. When the water contact angle is at least 100 degrees, the surface layer will be excellent in water repellency. The water contact angle of the surface layer is preferably as large as possible, and accordingly the upper limit value is not particularly limited. The water contact angle is measured by using a contact angle measuring apparatus (DM-500, trade name, manufactured by Kyowa Interface Science, Inc.).

When the surface layer has a water contact angle of at least 100 degrees and a water sliding angle of at most 20 degrees, the surface layer will be particularly excellent in fingerprint removability.

(Fluorinated Ether Compound)

The poly(oxyperfluoroalkylene) chain is, in view of more excellent water/oil repellency of the surface layer, preferably $(R^fO)_m$ (wherein $R^f$ is a perfluoroalkylene group, m in an integer of from 2 to 200, and $(R^fO)_m$ may consist of two or more types of $R^fO$ differing in the number of carbon atoms).

The definition of $(R^fO)_m$ will be described in detail hereinafter.

The specific fluorinated ether compound preferably has a hydrolyzable silyl group in view of more excellent storage stability of the compound, particularly preferably has at least two hydrolyzable silyl groups in view of more excellent abrasion resistance of the resulting surface layer.

The hydrolyzable silyl group in the specific fluorinated ether compound is —$SiR_nL_{3-n}$ wherein L is a hydrolyzable group.

The number average molecular weight of the specific fluorinated ether compound is preferably from 500 to 20,000, more preferably from 800 to 10,000, particularly preferably from 1,000 to 8,000. When the number average molecular weight is within such a range, the resulting surface layer will be excellent in abrasion resistance.

The specific fluorinated ether compound is preferably compound 1 in that the resulting surface layer will be more excellent in water/oil repellency.

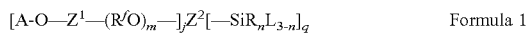

$[A-O-Z^1-(R^fO)_m-]_jZ^2[-SiR_nL_{3-n}]_q$      Formula 1

A is a perfluoroalkyl group or -$Q[-SiR_nL_{3-n}]_k$.

The number of carbon atoms in the perfluoroalkyl group is, in that the resulting surface layer will be more excellent in abrasion resistance, preferably from 1 to 20, more preferably from 1 to 10, further preferably from 1 to 6, particularly preferably from 1 to 3.

The perfluoroalkyl group may be linear or may be branched.

However, when A is -$Q[-SiR_nL_{3-n}]_k$, j is 1.

The perfluoroalkyl group may, for example, be $CF_3$—, $CF_3CF_2$—, $CF_3CF_2CF_2$—, $CF_3CF_2CF_2CF_2$—, $CF_3CF_2CF_2CF_2CF_2$—, $CF_3CF_2CF_2CF_2CF_2CF_2$— or $CF_3CF(CF_3)$—.

The perfluoroalkyl group is preferably $CF_3$—, $CF_3CF_2$— or $CF_3CF_2CF_2$— in that the resulting surface layer will be more excellent in water/oil repellency.

Q is a (k+1) valent linking group. As described hereinafter, k is an integer of from 1 to 10. Accordingly, Q may be a bivalent to undecavalent linking group.

Q may be any group which will not impair the effects of the present invention and may, for example, be an alkylene group which may have an etheric oxygen atom or a bivalent organopolysiloxane residue, a carbon atom, a nitrogen atom, a silicon atom, a bivalent to octavalent organopolysiloxane residue, or a group having $SiR_nL_{3-n}$ removed from the after-described formula 2-1, 2-2, 2-1-1 to 2-1-6.

R is a monovalent hydrocarbon group.

R is particularly preferably a monovalent saturated hydrocarbon group. The number of carbon atoms in the monovalent hydrocarbon group is preferably from 1 to 6, more preferably from 1 to 3, particularly preferably 1 or 2.

L is a hydrolyzable group or a hydroxy group.

The hydrolyzable group as L is a group which becomes a hydroxy group by hydrolysis reaction. That is, the hydrolyzable silyl group becomes a silanol group by hydrolysis reaction. Silanol groups will further be intermolecularly reacted to form Si—O—Si bonds. Further, a silanol group will react with a hydroxy group, a silanol group, a hydrolyzable silyl group or the like on the surface of the interlayer to form a chemical bond (interlayer-O—Si).

L is preferably a hydrolyzable group, and the hydrolyzable group may, for example, be an alkoxy group, a halogen atom, an acyl group, an acyloxy group, an isocyanate group (—NCO). The alkoxy group is preferably a $C_{1-4}$ alkoxy group. The halogen atom is preferably a chlorine atom.

L is, in view of easy industrial production, preferably a $C_{1-4}$ alkoxy group or a halogen atom. L is, since outgassing during application will be less, and storage stability of the compound will be more excellent, preferably a $C_{1-4}$ alkoxy group, an in a case where long term storage stability of the compound is required, particularly preferably an ethoxy group, and in a case where the reaction time after coating should be short, particularly preferably a methoxy group.

n is an integer of from 0 to 2.

n is preferably 0 or 1, particularly preferably 0. By the presence of a plurality of L, adhesion of the surface layer to the substrate will be more firm.

When n is at most 1, the plurality of L present in one molecule may be the same or different. In view of availability and production efficiency of the raw material, they are preferably the same.

The hydrolyzable silyl group is preferably —Si(OCH$_3$)$_3$, —SiCH$_3$(OCH$_3$)$_2$, —Si(OCH$_2$CH$_3$)$_3$, —SiCl$_3$, —Si(OC(O)CH$_3$)$_3$ or —Si(NCO)$_3$. In view of handling efficiency in industrial production, —Si(OCH$_3$)$_3$ is particularly preferred.

$Z^1$ is a single bond, a $C_{1-20}$ oxyfluoroalkylene group having at least one hydrogen atom substituted by a fluorine atom (excluding an oxyperfluoroalkylene group; the oxygen atom in the oxyfluoroalkylene group is bonded to (R$^f$O)m), or a $C_{1-20}$ poly(oxyfluoroalkylene) group having at least one hydrogen atom substituted by a fluorine atom (the oxygen atom in the oxyfluoroalkylene group bonded to (R$^f$O)$_m$ is bonded to (R$^f$O)$_m$; the oxyfluoroalkylene group bonded to (R$^f$O)$_m$ contains at least one hydrogen atom; and the poly (oxyfluoroalkylene) group may have both oxyperfluoroalkylene group having all hydrogen atoms substituted by a fluorine atom and oxyfluoroalkylene group containing at least one hydrogen atom). The number of carbon atoms in the oxyfluoroalkylene group or the poly(oxyfluoroalkylene) group is preferably from 1 to 10.

$Z^1$ is, in view of easy production of the compound, preferably a single bond, —CHFCF$_2$OCH$_2$CF$_2$O—, —CF$_2$CHFCF$_2$OCH$_2$CF$_2$CF$_2$O—, —CF$_2$CF$_2$CHFCF$_2$OCH$_2$CF$_2$O—, —CF$_2$CF$_2$OCHFCF$_2$OCH$_2$CF$_2$O—, —CF$_2$CF$_2$OCF$_2$CF$_2$OCHFCF$_2$OCH$_2$CF$_2$O—, —CF$_2$CH$_2$OCH$_2$CF$_2$O— or —CF$_2$CF$_2$OCF$_2$CH$_2$OCH$_2$CF$_2$O— (provided that the left side is bonded to A-O). $Z^1$ is particularly preferably a single bond or —CHFCF$_2$OCH$_2$CF$_2$O—.

R$^f$ is a perfluoroalkylene group.

The number of carbon atoms in the perfluoroalkylene group is preferably from 1 to 6, in that the resulting surface layer will be more excellent in water/oil repellency.

The perfluoroalkylene group may be linear or may be branched, and is preferably linear in that the resulting surface layer will be more excellent in water/oil repellency.

The plurality of R$^f$ may be the same or different. That is, (R$^f$O)$_m$ may consist of two or more types of R$^f$O differing in the number of carbon atoms.

m is an integer of from 2 to 200, preferably an integer of from 5 to 150, particularly preferably an integer of from 10 to 100. When m is at least the lower limit value in the above range, the resulting surface layer will be more excellent in water/oil repellency. When m is at most the upper limit value in the above range, the resulting surface layer will be more excellent in abrasion resistance.

In (R$^f$O)$_m$, when at least two types of R$^f$O differing in the number of carbon atoms are present, the bonding order of the respective R$^f$O is not limited. For example, when two types of R$^f$O are present, the two types of R$^f$O may be arranged randomly, alternately or in block.

(R$^f$O)$_m$ is, in that the resulting surface layer will be more excellent in water/oil repellency, preferably {(CF$_2$O)$_{m11}$ (CF$_2$CF$_2$O)$_{m12}$(CF$_2$CF$_2$CF$_2$O)$_{m13}$(CF$_2$CF$_2$CF$_2$CF$_2$O)$_{m14}$}, (CF$_2$CF$_2$O)$_{m16}$, (CF$_2$CF$_2$CF$_2$O)$_{m17}$, (CF$_2$CF$_2$O—CF$_2$CF$_2$CF$_2$CF$_2$O)$_{m15}$(CF$_2$CF$_2$O), (CF$_2$O—CF$_2$CF$_2$CF$_2$CF$_2$CF$_2$O)$_{m18}$(CF$_2$O) or (CF$_2$CF$_2$O—CF$_2$CF$_2$CF$_2$CF$_2$CF$_2$CF$_2$O)$_{m19}$(CF$_2$CF$_2$O), particularly preferably {(CF$_2$O)$_{m11}$(CF$_2$CF$_2$O)$_{m12}$(CF$_2$CF$_2$CF$_2$O)$_{m13}$ (CF$_2$CF$_2$CF$_2$CF$_2$O)$_{m14}$}, (CF$_2$CF$_2$O—CF$_2$CF$_2$CF$_2$CF$_2$O)$_{m15}$(CF$_2$CF$_2$O) or (CF$_2$O—CF$_2$CF$_2$CF$_2$CF$_2$CF$_2$O)$_{m18}$ (CF$_2$O) or (CF$_2$CF$_2$O—CF$_2$CF$_2$CF$_2$CF$_2$CF$_2$CF$_2$O)$_{m19}$ (CF$_2$CF$_2$O).

Here, mm11 and m12 are an integer of at least 1, m13 and m14 are an integer of 0 or at least 1, m11+m12+m13+m14 is an integer of from 2 to 200, the bonding order of each of m11 pieces of CF$_2$O, m12 pieces of CF$_2$CF$_2$O, m13 pieces of CF$_2$CF$_2$CF$_2$O and m14 pieces of CF$_2$CF$_2$CF$_2$CF$_2$O is not limited, m16 and m17 are an integer of from 2 to 200, and m15, m18 and m19 are an integer of from 1 to 99.

$Z^2$ is a (j+q) valent linking group.

$Z^2$ is any group which will not impair the effects of the present invention and may, for example, be an alkylene group which may have an etheric oxygen atom or a bivalent organopolysiloxane residue, a carbon atom, a nitrogen atom, a silicon atom, a bivalent to octavalent organopolysiloxane residue, or a group having SiR$_n$L$_{3-n}$ removed from the after-described formula 2-1, 2-2, 2-1-1 to 2-1-6.

j is an integer of at least 1, and is preferably an integer of from 1 to 5 in that the surface layer will be more excellent in water/oil repellency, particularly preferably 1 in that the compound is easily produced.

q is an integer of at least 1, preferably an integer of from 2 to 4 in that the surface layer will be more excellent in water/oil repellency, more preferably 2 or 3, particularly preferably 3.

The compound 1 is preferably compound 1-1 in that the surface layer will be more excellent in water/oil repellency.

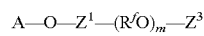

A—O—$Z^1$—(R$^f$O)$_m$—$Z^3$     Formula 1-1

In the formula 1-1, the definitions of A, $Z^1$, R$^f$ and m are the same as the definitions of the respective groups in the formula 1.

$Z^3$ is group 2-1 or 2-2.

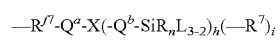

—R$^{f7}$-Q$^a$-X(-Q$^b$-SiR$_n$L$_{3-2}$)$_h$(—R$^7$)$_i$     Formula 2-1

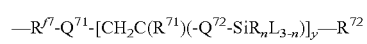

—R$^{f7}$-Q$^{71}$-[CH$_2$C(R$^{71}$)(-Q$^{72}$-SiR$_n$L$_{3-n}$)]$_y$—R$^{72}$     Formula 2-2

In the formulae 2-1 and 2-2, the definitions of R, L and n are the same as the definitions of the respective groups in the formula 1.

$R^{f7}$ is a perfluoroalkylene group.

The number of carbon atoms in the perfluoroalkylene group is preferably from 1 to 30, particularly preferably from 1 to 6.

The perfluoroalkylene group may be linear or may be branched. $R^{f7}$ is preferably —$CF_2CF_2CF_2CF_2$— or —$CF_2CF_2CF_2CF_2CF_2$— in that the compound is easily produced.

$Q^a$ is a single bond or a bivalent linking group.

The bivalent linking group may, for example, be a bivalent hydrocarbon group (it may be a bivalent saturated hydrocarbon group, a bivalent aromatic hydrocarbon group, an alkenylene group or an alkynylene group; the bivalent saturated hydrocarbon group may be linear, may be branched or may be cyclic; for example, an alkylene group may be mentioned; the number of carbon atoms is preferably from 1 to 20; the bivalent aromatic hydrocarbon group preferably has from 5 to 20 carbon atoms and for example, a phenylene group may be mentioned; and in addition, a $C_{2-20}$ alkenylene group or a $C_{2-20}$ alkynylene group may be mentioned), a bivalent heterocyclic group, —O—, —S—, —$SO_2$—, —N($R^d$)—, —C(O)—, —Si($R^a$)$_2$—, or a group comprising a combination of two or more types thereof. $R^a$ is an alkyl group (preferably $C_{1-10}$) or a phenyl group. $R^d$ is a hydrogen atom or an alkyl group (preferably $C_{1-10}$).

The group comprising a combination of two or more types thereof may, for example, be —OC(O)—, —C(O)N($R^d$)—, an alkylene group-O-alkylene group, an alkylene group-OC(O)-alkylene group, or an alkylene group-Si($R^a$)$_2$-phenylene group-Si($R^a$)$_2$.

X is a single bond, an alkylene group, a carbon atom, a nitrogen atom, a silicon atom or a bivalent to octavalent organopolysiloxane residue.

The alkylene group may have —O—, a silphenylene skeleton group, a bivalent organopolysiloxane residue or a dialkylsilylene group. The alkylene group may have a plurality of groups selected from the group consisting of —O—, a silphenylene skeleton group, a bivalent organopolysiloxane residue and a dialkylsilylene group.

The number of carbon atoms in the alkylene group represented by X is preferably from 1 to 20, particularly preferably from 1 to 10.

The bivalent to octavalent organopolysiloxane residue may be a bivalent organopolysiloxane residue or the after-described (w+1) valent organopolysiloxane residue.

$Q^b$ is a single bond or a bivalent linking group.

The definition of the bivalent linking group is the same as the definition described for the above $Q^a$.

$R^7$ is a hydroxy group or an alkyl group.

The number of carbon atoms in the alkyl group is preferably from 1 to 5, more preferably from 1 to 3, particularly preferably 1.

When X is a single bond or an alkylene group, h is 1 and i is 0, when X is a nitrogen atom, h is an integer of from 1 to 2, i is an integer of from 0 to 1, and h+i=2 is satisfied, when X is a carbon atom or a silicon atom, h is an integer of from 1 to 3, i is an integer of from 0 to 2, h+i=3 is satisfied and when X is a bivalent to octavalent organopolysiloxane residue, h is an integer of from 1 to 7, i is an integer of from 0 to 6, and h+i=1 to 7 is satisfied.

When there are two or more (-$Q^b$-$SiR_nL_{3-n}$), the two or more (-$Q^b$-$SiR_nL_{3-n}$) may be the same or different. When there are two or more $R^7$, the two or more (—$R^7$) may be the same or different.

$Q^{71}$ is a single bond, an alkylene group or a group having an etheric oxygen atom between carbon atoms of an alkylene group having at least 2 carbon atoms, and in view of easy production of the compound, preferably a single bond.

The number of carbon atoms in the alkylene group is preferably from 1 to 10, particularly preferably from 2 to 6.

The number of carbon atoms in the group having an etheric oxygen atom between carbon atoms of an alkylene group having at least 2 carbon atoms is preferably from 2 to 10, particularly preferably from 2 to 6.

$R^{71}$ is a hydrogen atom or a $C_{1-10}$ alkyl group, and in view of easy production of the compound, preferably a hydrogen atom.

The alkyl group is preferably a methyl group.

$Q^{72}$ is a single bond or an alkylene group. The number of carbon atoms in the alkylene group is preferably from 1 to 10, particularly preferably from 1 to 6. In view of easy production of the compound, $Q^{72}$ is preferably a single bond or —$CH_2$—.

$R^{72}$ is a hydrogen atom or a halogen atom, and in view of easy production of the compound, preferably a hydrogen atom.

y is an integer of from 1 to 10, preferably an integer of from 1 to 6.

The two or more [$CH_2C(R^{71})(-Q^{72}-SiR_nL_{3-n})$] may be the same or different.

As the group 2-1, groups 2-1-1 to 2-1-6 are preferred.

—$R^{f7}$—$(X^1)_p$-$Q^1$-$SiR_nL_{3-n}$      Formula 2-1-1

—$R^{f7}$—$(X^2)_r$-$Q^{21}$-N[-$Q^{22}$-$SiR_nL_{3-n}$]$_2$      Formula 2-1-2

—$R^{f7}$-$Q^{31}$-G($R^3$)[-$Q^{32}$-$SiR_nL_{3-n}$]$_2$      Formula 2-1-3

—$R^{f7}$-[C(O)N($R^d$)]$_s$-$Q^{41}$-(O)$_t$—C[—(O)$_u$-$Q^{42}$-$SiR_nL_{3-n}$]$_3$      Formula 2-1-4

—$R^{f7}$-$Q^{51}$-Si[-$Q^{52}SiR_nL_{3-n}$]$_3$      Formula 2-1-5

—$R^{f7}$-[C(O)N($R^d$)]$_v$-$Q^{61}$-$Z^3$[-$Q^{62}$-$SiR_nL_{3-n}$]$_w$      Formula 2-1-6

In the formulae 2-1-1 to 2-1-6, the definitions of $R^{f7}$, R, L and n are as defined above.

$X^1$ is —O— or —C(O)N($R^d$)— (provided that N in the formula is bonded to $Q^1$).

The definition of $R^d$ is as defined above.

p is 0 or 1.

$Q^1$ is an alkylene group. The alkylene group may have —O—, a silphenylene skeleton group, a bivalent organopolysiloxane residue or a dialkylsilylene group. The alkylene group may have a plurality of groups selected from the group consisting of —O—, a silphenylene skeleton group, a bivalent organopolysiloxane residue and a dialkylsilylene group.

In a case where the alkylene group has —O—, a silphenylene skeleton group, a bivalent organopolysiloxane residue or a dialkylsilylene group, it preferably has such a group between carbon atoms.

The number of carbon atoms in the alkylene group represented by $Q^1$ is preferably from 1 to 10, particularly preferably from 2 to 6.

Q is, when p is 0, preferably —$CH_2OCH_2CH_2CH_2$—, —$CH_2OCH_2CH_2OCH_2CH_2CH_2$—, —$CH_2CH_2$—, —$CH_2CH_2CH_2$— or —$CH_2OCH_2CH_2CH_2Si(CH_3)_2OSi$ $(CH_3)_2CH_2CH_2$—. When $(X^1)_p$ is —O—, preferred is —$CH_2CH_2CH_2$— or —$CH_2CH_2OCH_2CH_2CH_2$—. When $(X^1)_p$ is —C(O)N($R^d$)—, preferred is a $C_{2-6}$ alkylene group (provided that N in the formula is bonded to $Q^1$). When $Q^1$ is such a group, the compound is easily produced.

As specific examples of the group 2-1-1, the following groups may be mentioned.

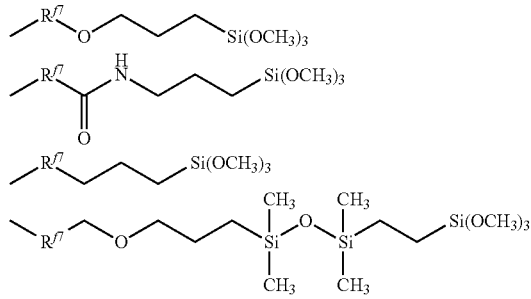

$X^2$ is —O—, —NH— or —C(O)N($R^d$)—.

The definition of $R^d$ is as defined above.

$Q^{21}$ is a single bond, an alkylene group, or a group having an etheric oxygen atom, —C(O)—, —C(O)O—, —OC(O)— or —NH— between carbon atoms of an alkylene group having at least 2 carbon atoms.

The number of carbon atoms in the alkylene group represented by $Q^{21}$ is preferably from 1 to 10, particularly preferably from 2 to 6.

The number of carbon atoms in the group having an etheric oxygen atom, —C(O)—, —C(O)O—, —OC(O)— or —NH— between carbon atoms of an alkylene group having at least 2 carbon atoms represented by $Q^{21}$ is preferably from 2 to 10, particularly preferably from 2 to 6.

$Q^{21}$ is, in view of easy production of the compound, preferably —$CH_2$—, —$CH_2CH_2$—, —$CH_2CH_2CH_2$—, —$CH_2OCH_2CH_2$—, —$CH_2NHCH_2CH_2$— or —$CH_2CH_2OC(OCH_2CH_2$— (provided that the right side is bonded to N).

r is 0 or 1 (0 when $Q^{21}$ is a single bond). It is preferably 0 in view of easy production of the compound.

$Q^{22}$ is an alkylene group, or a group having a bivalent organopolysiloxane residue, an etheric oxygen atom or —NH— between carbon atoms an alkylene group having at least 2 carbon atoms.

The number of carbon atoms in the alkylene group represented by $Q^{22}$ is preferably from 1 to 10, particularly preferably from 2 to 6.

The number of carbon atoms in the group having a bivalent organopolysiloxane residue, an etheric oxygen atom or —NH— between carbon atoms of an alkylene group having at least 2 carbon atoms represented by $Q^{22}$ is preferably from 2 to 10, particularly preferably from 2 to 6.

Q22 is, in view of easy production of the compound, preferably —$CH_2CH_2CH_2$— or —$CH_2CH_2OCH_2CH_2CH_2$— (provided that the right side is bonded to Si).

The two [-$Q^{22}$-$SiR_nL_{3-n}$] may be the same or different.

As specific examples of the group 2-1-2, the following groups may be mentioned.

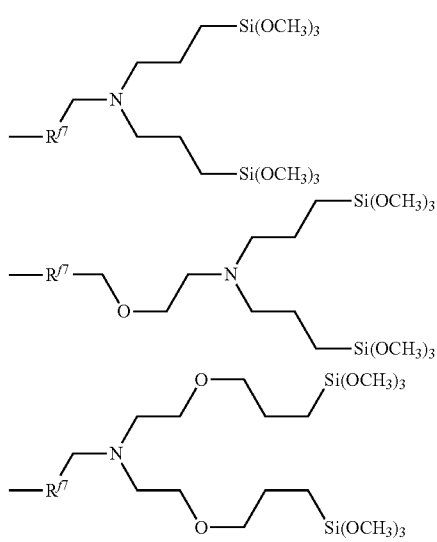

$Q^{31}$ is a single bond, an alkylene group or a group having an etheric oxygen atom between carbon atoms of an alkylene group having at least 2 carbon atoms, and in view of easy production of the compound, it is preferably a single bond.

The number of carbon atoms in the alkylene group represented by $Q^{31}$ is preferably from 1 to 10, particularly preferably from 2 to 6.

The number of carbon atoms in the group having an etheric oxygen atom between carbon atoms of an alkylene group having at least 2 carbon atoms represented by $Q^{31}$ is preferably from 2 to 10, particularly preferably from 2 to 6.

G is a carbon atom or a silicon atom.

$R^6$ is a hydroxy group or an alkyl group. The number of carbon atoms in the alkyl group represented by $R^3$ is preferably from 1 to 4.

G($R^3$) is, in view of easy production of the compound, preferably C(OH) or Si($R^{3a}$) (wherein $R^{3a}$ is an alkyl group, the number of carbon atoms in the alkyl group is preferably from 1 to 10, and a methyl group is particularly preferred).

$Q^{32}$ is an alkylene group, or a group having an etheric oxygen atom or a bivalent organopolysiloxane residue between carbon atoms of an alkylene group having at least 2 carbon atoms.

The number of carbon atoms in the alkylene group represented by $Q^{32}$ is preferably from 1 to 10, particularly preferably from 2 to 6.

The number of carbon atoms in the group having an etheric oxygen atom or a bivalent organopolysiloxane residue between carbon atoms of an alkylene group having at least 2 carbon atoms represented by $Q^{32}$ is preferably from 2 to 10, particularly preferably from 2 to 6.

$Q^{32}$ is, in view of easy production of the compound, preferably —$CH_2CH_2$—, —$CH_2CH_2CH_2$— or —$CH_2CH_2CH_2CH_2CH_2CH_2CH_2CH_2$—.

The two [-$Q^{32}$-$SiR_nL_{3-n}$] may be the same or different.

As specific examples of the group 2-1-3, the following groups may be mentioned.

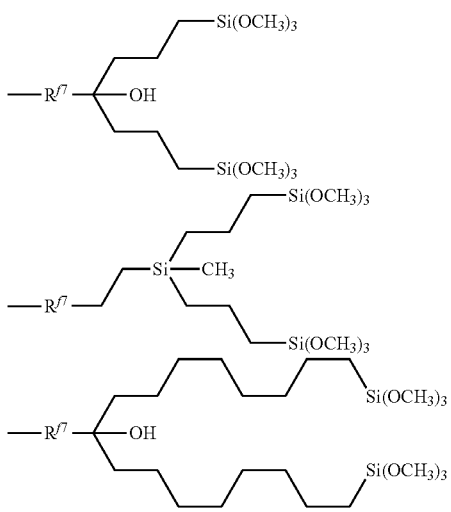

The definition of $R^d$ in the formula 2-1-4 is as described above.

s is 0 or 1.

$Q^{41}$ is a single bond, an alkylene group, or a group having an etheric oxygen atom between carbon atoms of an alkylene group having at least 2 carbon atoms.

The number of carbon atoms in the alkylene group represented by Q41 is preferably from 1 to 10, particularly preferably from 2 to 6.

The number of carbon atoms in the group having an etheric oxygen atom between carbon atoms of an alkylene group having at least 2 carbon atoms represented by $Q^{41}$ is preferably from 2 to 10, particularly preferably from 2 to 6.

t is 0 or 1 (0 when $Q^{41}$ is a single bond).

$-Q^{41}-(O)_t-$ is, in view of easy production of the compound, when s is 0, preferably a single bond, $-CH_2O-$, $-CH_2OCH_2-$, $-CH_2OCH_2CH_2O-$, $-CH_2OCH_2CH_2OCH_2-$ or $-CH_2OCH_2CH_2CH_2CH_2OCH_2-$ (provided that the left side is bonded to $R^{f7}$), and when s is 1, preferably a single bond, $-CH_2-$ or $-CH_2CH_2-$.

$Q^{42}$ is an alkylene group, and the alkylene group may have $-O-$, $-C(O)N(R^d)-$ (the definition of $R^d$ is as described above), a silphenylene skeleton group, a bivalent organopolysiloxane residue or a dialkylsilylene group.

In a case where the alkylene group has $-O-$ or a silphenylene skeleton group, the alkylene group preferably has $-O-$ or a silphenylene skeleton group between carbon atoms. Further, when the alkylene group has $-C(O)N(R^d)-$, a dialkylsilylene group or a bivalent organopolysiloxane residue, the alkylene group preferably has such a group between carbon atoms or at the terminal on the side bonded to $(O)_{u1}$.

The number of carbon atoms in the alkylene group represented by Q42 is preferably from 1 to 10, particularly preferably from 2 to 6.

u is 0 or 1.

$-(O)_u-Q^{42}-$ is, in view of easy production of the compound, preferably $-CH_2CH_2-$, $-CH_2CH_2CH_2-$, $-CH_2OCH_2CH_2CH_2-$, $-CH_2OCH_2CH_2CH_2CH_2-$, $-OCH_2CH_2CH_2-$, $-OSi(CH_3)_2CH_2CH_2CH_2-$, $-OSi(CH_3)_2OSi(CH_3)_2CH_2CH_2CH_2-$ or $-CH_2CH_2CH_2Si(CH_3)_2OSi(CH_3)_2CH_2CH_2-$ (provided that the right side is bonded to Si).

The three $[-(O)_u-Q^{42}-SiR_nL_{3-n}]$ may be the same or different.

As specific examples of the group 2-1-4, the following groups may be mentioned.

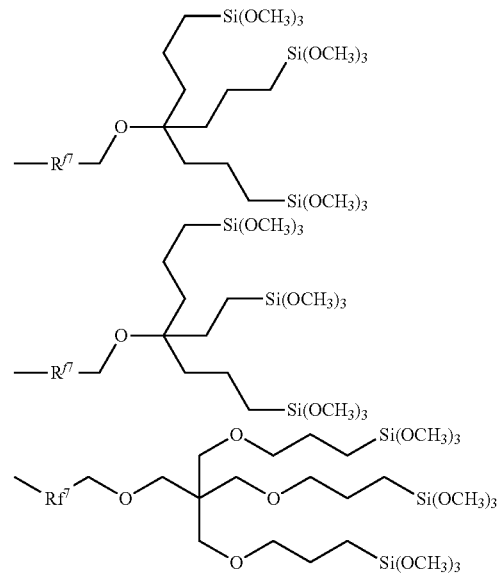

$Q^{51}$ is an alkylene group or a group having an etheric oxygen atom between carbon atoms of an alkylene group having at least 2 carbon atoms.

The number of carbon atoms in the alkylene group represented by $Q^{51}$ is preferably from 1 to 10, particularly preferably from 2 to 6.

The number of carbon atoms in the group having an etheric oxygen atom between carbon atoms of an alkylene group having at least 2 carbon atoms represented by $Q^{51}$ is preferably from 2 to 10, particularly preferably from 2 to 6.

$Q^{51}$ is, in view of easy production of the compound, preferably $-CH_2OCH_2CH_2CH_2-$, $-CH_2OCH_2CH_2OCH_2CH_2-$, $-CH_2CH_2-$ or $-CH_2CH_2CH_2-$ (provided that the right side is bonded to Si).

$Q^{52}$ is an alkylene group or a group having an etheric oxygen atom or a bivalent organopolysiloxane residue between carbon atoms of an alkylene group having at least 2 carbon atoms.

The number of carbon atoms in the alkylene group represented by $Q^{52}$ is preferably from 1 to 10, particularly preferably from 2 to 6.

The number of carbon atoms in the group having an etheric oxygen atom or a bivalent organopolysiloxane residue between carbon atoms of an alkylene group having at least 2 carbon atoms represented by $Q^{52}$ is preferably from 2 to 10, particularly preferably from 2 to 6.

$Q^{52}$ is, in view of easy production of the compound, preferably $-CH_2CH_2CH_2-$ or $-CH_2CH_2OCH_2CH_2CH_2-$ (provided that the right side is bonded to $SiR_nL_{3-n}$).

The three $[-Q^{52}-SiR_nL_{3-n}]$ may be the same or different.

As a specific example of the group 2-1-5, the following group may be mentioned.

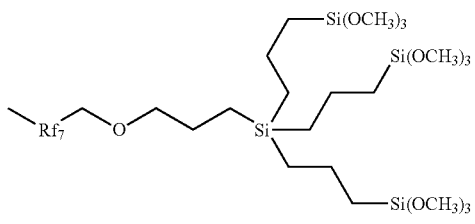

The definition of $R^d$ in the formula 2-1-6 is as described above.

v is 0 or 1.

$Q^{61}$ is an alkylene group or a group having an etheric oxygen atom between carbon atoms of an alkylene group having at least 2 carbon atoms.

The number of carbon atoms in the alkylene group represented by $Q^{61}$ is preferably from 1 to 10, particularly preferably from 2 to 6.

The number of carbon atoms in the group having an etheric oxygen atom between carbon atoms of an alkylene group having at least 2 carbon atoms represented by Q61 is preferably from 2 to 10, particularly preferably from 2 to 6.

$Q^{61}$ is, in view of easy production of the compound, preferably —CH$_2$OCH$_2$CH$_2$CH$_2$—, —CH$_2$OCH$_2$CH$_2$OCH$_2$CH$_2$CH$_2$—, —CH$_2$CH$_2$— or —CH$_2$CH$_2$CH$_2$— (provided that the right side is bonded to $Z^3$).

$Z^3$ is a (w+1) valent organopolysiloxane residue.

w is an integer of from 2 to 7.

As the (w+1) valent organopolysiloxane residue, the following groups may be mentioned. $R^a$ in the following formulae is as described above.

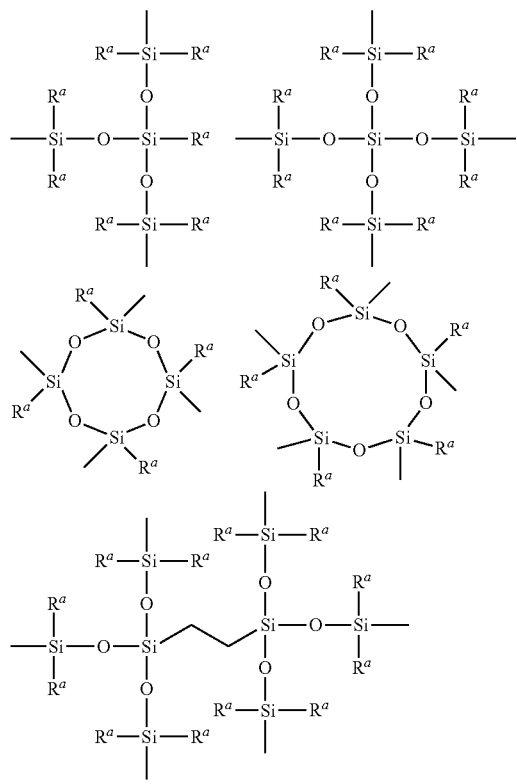

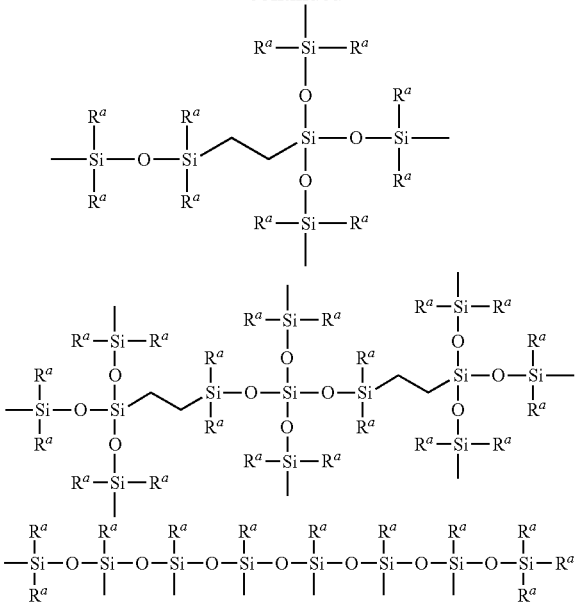

$Q^{62}$ is an alkylene group or a group having an etheric oxygen atom or a bivalent organopolysiloxane residue between carbon atoms of an alkylene group having at least 2 carbon atoms.

The number of carbon atoms in the alkylene group represented by $Q^{62}$ is preferably from 1 to 10, particularly preferably from 2 to 6.

The number of carbon atoms in the group having an etheric oxygen atom or a bivalent organopolysiloxane residue between carbon atoms of an alkylene group having at least 2 carbon atoms represented by $Q^{62}$ is preferably from 2 to 10, particularly preferably from 2 to 6.

$Q^{62}$ is, in view of easy production of the compound, preferably —CH$_2$CH$_2$— or —CH$_2$CH$_2$CH$_2$—.

The w [-$Q^{62}$-SiR$_n$L$_{3-n}$] may be the same or different.

As the fluorinated ether compound, commercial products may be used. For example, KY-100 series (KY-178, KY-185, KY-195, etc.) manufactured by Shin-Etsu Chemical Co., Ltd., OPTOOL (registered trademark) DSX, OPTOOL (registered trademark) AES, OPTOOL (registered trademark) UF503, OPTOOL (registered trademark) UD509, manufactured by Daikin Industries, Ltd., and Afluid (registered trademark) S550, manufactured by Asahi Glass Company, Limited may be mentioned.

[Application]

The laminate of the present invention is preferably used for an article for an electronic device, an article for a transport device, an article for a precision device, an article for an optical device or an article for building. The laminate of the present invention may also be used for an article for a device other than the above.

The article for an electronic device may, for example, be specifically glass for a display of a communication terminal or an image display device, a protective film for a display, an antireflection film or a fingerprint sensor. The article for a transport device may, for example, be specifically an exterior member, an interior member, glass (windshield, side glass or rear glass), a mirror or a tire wheel of e.g. a train, an automobile, ship or an aircraft. The article for a precision device may, for example, be specifically a window material of a photo equipment. The article for an optical device may, for example, be specifically a lens. The article for building may, for example, be specifically a window, a floor material, a wall material or a door material.

Specific examples of articles to which the laminate of the present invention is applicable will be described in detail below.

A car navigation system, a car audio system, a tablet computer, a notebook personal computer, a watch/eyeglass type wearable terminal, a portable (communication) information terminal such as a mobile phone or a smartphone, a digital camera, a digital video camera, a PDA, a portable audio player, a game equipment, an operation panel, a digital media player, an e-reader, a chassis of a coping machine, etc.

A display such as a liquid crystal display, a cathode ray tube (CRT, ex. TV, a personal computer monitor), an organic EL display, a plasma display, an inorganic thin film EL dot matrix display, a rear projection display, a vacuum fluorescent display (VFD) or a field emission display (FED), a front protective plate, an antireflection plate, a polarizing plate or an antiglare plate of such a display, or an article having an antireflection film formed on the surface of such a plate.

A touch panel sheet or a touch panel display of an electronic equipment having a contact display input device (such as a mobile phone or a personal digital assistant).

A water repellent member to be used for solar cell panels, etc. and a recording medium such as an optical disc or a magnetic disc, for example, Blu-ray (registered trademark) disc, a DVD disc, CD-R or MO.

A sunglass lens, a spectacle lens, a prism, a lens sheet, a pellicle, a polarizing plate, an optical filter, a lenticular lens, a Fresnel lens, an antireflection film, an optical fiber, an optical coupler, an antireflection layer-coated ophthalmological lens, a binocular lens, a camera lens, a lens filter, a gastro camera lens.

An exterior of a vehicle such as a bicycle, an exterior of a musical instrument and furniture, surface of a building stone such as marble or artificial marble, a decorative building material for restroom, bathroom, lavatory, kitchen and the like, a glass-decorated electric appliance (such as a refrigerator), protective glass for fine art display, a show window, a showcase, a photo frame cover, a display surface of a watch, a clock cover.

A display case, an overhead projector, a stereo cabinet door, a stereo cover, an exterior of a ceramic product, a fabric product, a leather product, medical goods and medical equipment.

A pavement marker (for example, a raised pavement marker), a pavement marking tape, a retroreflective sheeting.

An O-ring, a shaft seal, a gasket, a tube, a back fabric, a sheet, a container, a lid, a hose, or a constituent therefor, to be used for a fuel system, a film, or a protective film of e.g. a bonded seal, a bearing, a crank shaft, a slide bearing, a piston, a gasket, a gear, a door panel, an instrument panel, a door lock, a timing belt, a body seal for a sunroof, a glass run, a weather strip, a rotating bearing, a bush bearing, a pivot pin, a cam, a guide, a way, a drive screw, a gear, a spline or a chain.

Waterproof coating for a wiring board, a water repellent/waterproof member of a heat exchanger, a water repellent member of an electrolytic bath, a waterproof/water repellent member of a printed wiring board, an antifouling member of a charged roll, an antifouling member of a substrate conveying equipment, an insulating property-improving member of a high-frequency heating element, an insulating property-improving member of a power transmission line, a waterproof/water repellent member of a filter, a waterproof member of a wave absorber or a sound absorbing material.

A surface protective member of e.g. a release mold to be used for e.g. extrusion, injection molding, calendaring, blowing, FRP molding, laminate molding, cast molding, powder molding, solvent casting, vacuum/air-pressure forming, composite extrusion, stretching, expansion molding, post-forming, compression molding, blow molding or nanoimprinting, a water repellent/water proof/water sliding member of a heat exchanger, a member for a surface low friction coating on the inside of a vibrating strainer or a cylinder, a machine member, a vacuum device member, a bearing member or a tool.

[Method for Producing Laminate]

To produce the laminate of the present invention, a method may be mentioned comprising forming the interlayer on the substrate by using the specific triazine compound, and forming a surface layer on the surface of the interlayer by using the fluorinated ether compound.

Formation of the interlayer and formation of the surface layer may be carried out by dry coating method or wet coating method. By the dry coating method, the interlayer or the surface layer is formed by using the specific triazine compound or the fluorinated ether compound.

By the wet coating method, a solution using a liquid medium is applied to form a layer containing the liquid medium, and then the liquid medium is removed (hereinafter sometimes referred to as drying) to form the interlayer or the surface layer. More specifically, a composition containing the specific triazine compound and a liquid medium (hereinafter sometimes referred to as "interlayer-forming composition") is applied, followed by drying to form the interlayer on the substrate. Further, a composition containing the fluorinated ether compound and a liquid medium (hereinafter sometimes referred to as "surface layer-forming composition") is applied, followed by drying to form the surface layer on the interlayer.

(Formation of Interlayer)

The liquid medium contained in the interlayer-forming composition may, for example, be specifically water or an organic solvent. The organic solvent may, for example, be specifically a fluorinated organic solvent or a non-fluorinated organic solvent.

The organic solvent may be used alone or in combination of two or more.

The fluorinated organic solvent may, for example, be specifically a fluorinated alkane, a fluorinated aromatic compound, a fluoroalkyl ether, a fluorinated alkylamine or a fluoroalcohol.

The fluorinated alkane is preferably a $C_{4-8}$ compound, such as $C_6F_{13}H$ (AC-2000, trade name, manufactured by Asahi Glass Company, Limited), $C_6F_{13}C_2H_5$ (AC-6000, trade name, manufactured by Asahi Glass Company, Limited) or $C_2F_5CHFCHFCF_3$ (Vertrel, trade name, manufactured by DuPont).

The fluorinated aromatic compound may, for example, be specifically hexafluorobenzene, trifluoromethylbenzene, perfluorotoluene, 1,3-bis(trifluoromethyl)benzene or 1,4-bis(trifluoromethyl)benzene.

The fluoroalkyl ether is preferably a $C_{4-12}$ compound, such as $CF_3CH_2OCF_2CF_2H$ (AE-3000, trade name, manufactured by Asahi Glass Company, Limited), $C_4F_9OCH_3$ (Novec-7100, trade name, manufactured by 3M), $C_4F_9OC_2H_5$ (Novec-7200, trade name, manufactured by 3M) or $C_2F_5CF(OCH_3)C_3F_7$ (Novec-7300, trade name, manufactured by 3M).

The fluorinated alkylamine may, for example, be specifically perfluorotripropylamine or perfluorotributylamine.

The fluoroalcohol may, for example, be specifically 2,2,3,3-tetrafluoropropanol, 2,2,2-trifluoroethanol or hexafluoroisopropanol.

The non-fluorinated organic solvent is preferably a compound consisting solely of hydrogen atoms and carbon atoms or a compound consisting solely of hydrogen atoms, carbon atoms and oxygen atoms, and may be specifically a hydrocarbon organic solvent, a ketone organic solvent, an ether organic solvent, an ester organic solvent or an alcohol organic solvent.

The hydrocarbon organic solvent may, for example, be specifically hexane, heptane or cyclohexane.

The ketone organic solvent may, for example, be specifically acetone, methyl ethyl ketone or methyl isobutyl ketone.

The ether organic solvent may, for example, be specifically diethyl ether, tetrahydrofuran or tetraethylene glycol dimethyl ether.

The ester organic solvent may, for example, be specifically ethyl acetate or butyl acetate.

The alcohol organic solvent may, for example, be specifically methanol, ethanol, propanol or butanol.

The liquid medium contained in the interlayer-forming composition is preferably water, the fluorinated organic solvent, the alcohol organic solvent or a mixed organic solvent thereof.

The content of the liquid medium is preferably from 50.00 to 99.99 mass %, particularly preferably from 70.00 to 99.95 mass % to the total mass of the interlayer-forming composition.

The content of the specific triazine compound is preferably from 0.01 to 50.00 mass %, particularly preferably from 0.05 to 30.00 mass % to the total mass of the interlayer-forming composition.

Further, the content of the specific triazine compound is preferably from 50 to 100 mass %, particularly preferably from 70 to 100 mass % to the total solid content mass in the interlayer-forming composition.

The interlayer may be formed, for example, by the following method.

A method of treating the surface of the substrate by dry coating using the specific triazine compound to obtain the interlayer.

A method of applying the interlayer-forming composition to the surface of the substrate by wet coating method, followed by drying to obtain the interlayer.

The dry coating method may, for example, be specifically vacuum deposition method, CVD method or sputtering method.

The wet coating method may, for example, be specifically spin coating method, wipe coating method, spray coating method, squeegee coating method, dip coating method, die coating method, ink jet coating method, flow coating method, roll coating method, casting method, Langmuir-Blodgett method or gravure coating method.

The interlayer formed by the above procedure contains a compound obtained via the hydrolysis and condensation reaction of the specific triazine compound.

(Formation of Surface Layer)

The liquid medium contained in the surface layer-forming composition may, for example, be specifically an organic solvent. The organic solvent may, for example, be specifically a fluorinated organic solvent or a non-fluorinated organic solvent.

The organic solvent may be used alone or in combination of two or more.

Specific examples of the fluorinated organic solvent and the non-fluorinated organic solvent are the same as those as the liquid medium contained in the interlayer-forming composition. Here, for the surface layer-forming composition, among the specific examples of the non-fluorinated organic solvent, preferred is the hydrocarbon organic solvent, the ketone organic solvent, the ether organic solvent, the ester organic solvent or the alcohol organic solvent.

The liquid medium contained in the surface layer-forming composition is particularly preferably the fluorinated organic solvent, the alcohol organic solvent or a mixed solvent thereof.

The content of the liquid medium is preferably from 50.00 to 99.99 mass %, particularly preferably from 70.00 to 99.95 mass % to the total mass of the surface layer-forming composition.

The content of the fluorinated ether compound is preferably from 0.01 to 50.00 mass %, particularly preferably from 0.05 to 30.00 mass % to the total mass of the surface layer-forming composition.

Further, the content of the fluorinated ether compound is preferably from 30 to 100 mass %, particularly preferably from 50 to 100 mass % to the total solid content mass of the surface layer-forming composition.

The surface layer may be produced, for example, by the following method.

A method of treating the surface of the interlayer by dry coating by using the fluorinated ether compound to obtain the surface layer.

A method of applying the surface layer-forming composition to the surface of the interlayer by the wet coating method, followed by drying to obtain the surface layer.

The specific examples of the dry coating method and the wet coating method in production of the surface layer are the same as the specific examples mentioned for production of the interlayer.

Particularly in a case where the surface layer is produced by the dry coating method, vacuum deposition method is preferred in that decomposition of the fluorinated ether compound is suppressed, and in view of simplicity of the apparatus. At the time of vacuum deposition, a pelletized material having a metal porous product of iron, steel or the like impregnated with the fluorinated ether compound or the surface layer-forming composition may be used.

The surface layer formed by the above procedure contains a compound obtained via the hydrolysis and condensation reaction of the fluorinated ether compound.

Here, the fluorinated ether compound or the surface layer-forming composition is preferably brought into contact with the interlayer before the M-OH group or the group capable of forming the M-OH group contained in the interlayer is inactivated by a reaction such as condensation, whereby the adhesion between the interlayer and the surface layer will improve.

EXAMPLES

Now, the present invention will be described in further detail with reference to Examples. However, it should be understood that the present invention is by no means restricted to such specific Examples. The blend amounts of the respective components are based on mass. Among Ex. 1 to 10, Ex. 1 to 4 and 6 to 9 are Examples of the present invention, and Ex. 5 and 10 are Comparative Examples.
[Evaluation Methods]
(Water Contact Angle)

The contact angle of about 2 μL of distilled water placed on the surface of the surface layer was measured by using a contact angle measuring apparatus (DM-500, trade name, manufactured by Kyowa Interface Science, Co., Ltd.). Measurements were conducted at five different points of the surface of the surface layer, and the average value was calculated. For the calculation of the contact angle, a 2θ method was employed.

(Water Sliding Angle)

50 μL of distilled water was dropped on the surface layer horizontally held, and the substrate on which the surface layer was formed was gradually inclined, and the angle (sliding angle) formed by the surface of the surface layer when the water droplet started sliding and the horizontal plane was measured by using a sliding angle measuring apparatus (SA-11, trade name, manufactured by Kyowa Interface Science, Co., Ltd.). Distilled water was dropped on five different points on the surface of the surface layer, the respective sliding angles were measured, and the average value was calculated.

(Fingerprint Removability)

Fingerprints attached to the surface layer were wiped off by a cellulose nonwoven fabric (BEMCOT M-3, trade name, manufactured by Asahi Kasei Corporation), and fingerprint removability was visually evaluated. The evaluation standards are as follows.

○ (Good): Fingerprints completely wiped off.

Δ (Acceptable): Fingerprint stains remain.

× (Poor): Fingerprint stains spread and cannot be wiped off.

[Compounds Used in Examples]
(Triazine Compound)

Compound TN-3A: Prepared by the method of the reaction formulae 1-1 and 1-2 in Example 1 of Japanese Patent No. 5729852.

Compound TN-3B: Prepared by the method of the reaction formulae 5-1 and 5-2 in Example 4 of Japanese Patent No. 5729852.

Compound TS-A: Compound used in paragraph 0034 of Japanese Patent No. 5166980 was used.

Formula TN-3A $$\text{NHC}_3\text{H}_6\text{Si(OC}_2\text{H}_5)_3$$

with triazine ring bearing $\text{H}_2\text{NC}_2\text{H}_4\text{HN}$ and $\text{NHC}_2\text{H}_4\text{NH}_2$ Formula TN-3B $$\text{NHC}_3\text{H}_6\text{Si(OC}_2\text{H}_5)_3$$

with triazine ring bearing $\text{H}_2\text{NC}_2\text{H}_4\text{HN}$ and $\text{NHC}_3\text{H}_5\text{Si(OC}_2\text{H}_5)_3$ Formula TS-A $$\text{NHC}_3\text{H}_6\text{Si(OC}_2\text{H}_5)_3$$

with triazine ring bearing HS and SNa (Fluorinated Ether Compound)

Compound 1A: Compound having a number average molecular weight of 4,430, prepared by the method for preparing compound 3 in Example 1 of JP-A-2015-199906.

Compound 1B: Compound having a number average molecular weight of 4,570.

Formula 1A $$CF_3O-(CF_2O)_{p1}-(C_2F_4O)_{q1}-CF_2-\underset{\underset{CH_2CH_2CH_2-Si(OCH_3)_3}{|}}{\overset{\overset{OH}{|}}{C}}-CH_2CH_2CH_2-Si(OCH_3)_3$$

Formula 1B $$C_3H_7-(OCF_2CF_2CF_2)_{24}-O(CF_2)_2-\left[CH_2CH\underset{Si-(OCH_3)_3}{|}\right]_{1-10}-H$$

Ex. 1 to 10

(Preparation of Substrate)

In Ex. 1 to 10, the following substrates were used.

Each substrate was washed with an alkali aqueous solution (Cica Clean LX-IV, trade name, manufactured by KANTO CHEMICAL CO., INC., concentration: 10 mass %) and further washed with deionized water, and corona discharge treatment was applied to one surface of the washed substrate. And, an interlayer (or a surface layer when no interlayer was formed) was formed on the surface having the corona discharge treatment applied thereto.

Sapphire: manufactured by Namiki Precision Jewel Co., Ltd.

DLC: DLC (diamond-like carbon) of about 100 nm was film-formed on the surface of a glass substrate (Dragontrail, registered trademark, manufactured by Asahi Glass Company, Limited) by plasma CVD method using acetylene as a raw material.

Hard coat: An UV curable resin composition (BEAMSET 575CL, trade name, manufactured by ARAKAWA CHEMICAL INDUSTRIES, LTD.) was diluted with isopropyl alcohol to a solid content of 50 mass % to obtain a solution. The obtained solution was applied to the surface of an acrylic substrate (manufactured by Asahi Kasei Corporation) by a bar coater, and the acrylic substrate having a coating film containing the solvent was dried at 80° C. for 60 seconds and irradiated with ultraviolet rays by a high pressure mercury lamp so that the irradiation amount would be 300 mJ/cm² to obtain an acrylic resin substrate with a hard coat layer.

SUS: Stainless steel SUS304

(Formation of Interlayer)

In a case where the compound TN-3A or TN-3B was used, an interlayer was formed by the following procedure. First, an aqueous solution containing 0.1 mass % of the compound TN-3A or TN-3B was prepared. Then, the substrate as identified in Table 1 was immersed in the aqueous solution at 25° C. for 10 minutes, sufficiently washed with water and dried at 80° C. for 30 minutes, thereby to form an interlayer by using a triazine compound on the substrate surface.

Further, in a case where the compound TS-A was used, an interlayer was formed by the following procedure. First, a solution containing 0.1 mass % of the compound TS-A in a mixed solvent of water and ethanol (water:ethanol=95 mass %:5 mass %) was prepared. Then, the substrate as identified in Table 1 was immersed in the solution at 25° C. for 10 minutes, sufficiently washed with water and dried at 80° C. for 30 minutes, thereby to form an interlayer by using a triazine compound on the substrate surface.

In Ex. 5 and 10, no interlayer was formed.
(Formation of Surface Layer)

By dry coating method, a surface layer was formed on the surface of the interlayer.

Specifically, first, 35 mg of the compound 1A or 1B was filled in a boat made of molybdenum in a vacuum deposition apparatus (SGC-22WA, trade name, manufactured by SHOWA SHINKU CO., LTD.), and inside of the vacuum deposition apparatus was evacuated to a level of at most $5 \times 10^{-3}$ Pa. The boat having the compound placed therein was heated so that the compound was deposited on the surface of the interlayer thereby to form a deposited film on the surface of the interlayer. The boat was left at rest at a temperature of 25° C. under a humidity of 40% RH for 12 hours to obtain a laminate having a surface layer obtained by using a fluorinated ether compound on the surface of the interlayer.

In Ex. 5 and 10, a laminate was obtained in accordance with the above procedure except that the surface layer was directly formed on the substrate, since no interlayer was formed.

TABLE 1

| Ex. | Substrate Type of substrate surface | Interlayer Type of triazine compound | Surface layer Type of fluorinated ether compound | Evaluation results | | |
|---|---|---|---|---|---|---|
| | | | | Water contact angle (degree) | Water sliding angle (degree) | Fingerprint removability |
| 1 | Sapphire | TN-3A | 1A | 115 | 16 | ○ |
| 2 | DLC | TN-3A | 1A | 115 | 15 | ○ |
| 3 | Hard coat | TN-3A | 1A | 113 | 18 | ○ |
| 4 | SUS | TN-3A | 1A | 113 | 13 | ○ |
| 5 | Sapphire | Nil | 1A | 114 | 45 | X |
| 6 | Sapphire | TN-3B | 1B | 116 | 12 | ○ |
| 7 | DLC | TS-1A | 1B | 114 | 19 | Δ |
| 8 | Hard coat | TS-1A | 1B | 112 | 18 | Δ |
| 9 | SUS | TN-3B | 1B | 114 | 16 | ○ |
| 10 | DLC | Nil | 1B | 108 | >50 | X |

As shown in Table 1, it was confirmed that in a case where the laminate has an interlayer formed by using a specific triazine compound, a surface layer with a small water sliding angle can be formed and as a result, the fingerprint removability was excellent (Ex. 1 to 4 and 6 to 9). Thus, with an interlayer formed by using a specific triazine compound, a surface layer excellent in fingerprint removability can be formed on various substrates.

On the other hand, it was confirmed that in a case where the laminate has no interlayer, the obtainable surface layer has a large water sliding angle and is inferior in the fingerprint removability (Ex. 5 and 10).

What is claimed is:
1. A laminate comprising:
a substrate,
an interlayer formed on the substrate, and
a surface layer formed on the interlayer,
wherein the interlayer is a layer formed of at least one triazine compound selected from the group consisting of compounds of formula TN-1, compounds of formula TN-2 and compounds of formula TS, and
the surface layer is a layer formed of a fluorinated ether compound having a poly(oxyperfluoroalkylene) chain, and at least one of a hydrolyzable group bonded to a silicon atom and a hydroxy group bonded to a silicon atom,

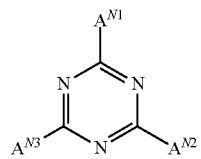

Formula TN-1

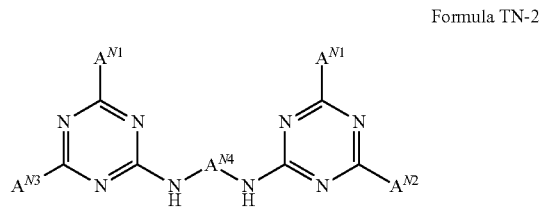

Formula TN-2

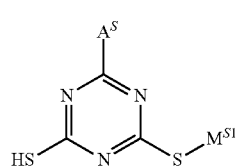

Formula TS wherein $A^{N1}$ is $-N(R^{N1})-R^{N2}-Si(R^{N3})_{Nn}(OR^{N4})_{3-Nn}$ or $-N\{R^{N2}-Si(R^{N3})_{Nn}(OR^{N4})_{3-Nn}\}_2$, $A^{N2}$ is $-N(R^{N5})-R^{N6}(NH_2)_{Nm}$ or $-N\{R^{N6}(NH_2)_{Nm}\}_2$, $A^{N3}$ is $A^{N1}$, $A^{N2}$ or $-N(R^{N7})-R^{N8}$, $A^{N4}$ is a bivalent linking group, $R^{N1}$, $R^{N5}$ and $R^{N7}$ are each independently a hydrogen atom or a monovalent hydrocarbon group, $R^{N2}$ is a bivalent linking group, $R^{N3}$ and $R^{N8}$ are each independently a monovalent hydrocarbon group, $R^{N4}$ is a hydrogen atom or a monovalent hydrocarbon group, $R^{N6}$ is a (Nm+1) valent linking group, Nn is an integer of from 0 to 2, and Nm is 1 or 2, and,
wherein $A^S$ is $-N(R^{S4})-R^{S1}-Si(R^{S2})_{Sn}(OR^{S3})_{3-Sn}$ or $-N\{R^{S1}-Si(R^{S2})_{Sn}(OR^{S3})_{3-Sn}\}_2$, $R^{S1}$ is a single bond or a bivalent linking group, $R^{S2}$ is a monovalent hydrocarbon group, $R^{S3}$ and $R^{S4}$ are each independently a hydrogen atom or a monovalent hydrocarbon group, $M^{S1}$ is a hydrogen atom or an alkali metal atom, and Sn is an integer of from 0 to 2.

2. The laminate according to claim 1, wherein the fluorinated ether compound is represented by formula 1:

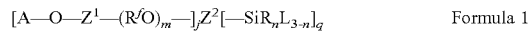

Formula 1 wherein A is a perfluoroalkyl group or $-Q[-SiR_nL_{3-n}]_k$,

Q is a (k+1) valent linking group, k is an integer of from 1 to 10,

R is a monovalent hydrocarbon group,

L is a hydrolyzable group or a hydroxy group, is an integer of from 0 to 2, $Z^1$ is a single bond, a $C_{1-20}$ oxyfluoroalkylene group having at least one hydrogen atom substituted by a fluorine atom, or a $C_{1-20}$ poly(oxyfluoroalkylene) group having at least one hydrogen atom substituted by a fluorine atom, $R^f$ is a perfluoroalkylene group, m is an integer of from 2 to 200, $Z^2$ is a (j+q) valent linking group, and j and q are each independently an integer of at least 1.

3. The laminate according to claim 2, wherein A is a perfluoroalkyl group.

4. The laminate according to claim 1, wherein the substrate has, on the outermost surface on the interlayer side, a sapphire layer, a metal layer, a metal oxide layer, a diamond-like carbon layer or a resin layer.

5. An article comprising the laminate according claim 1, wherein the article is an article for an electronic device, an article for a transport device, an article for a precision device, an article for an optical device or an article for building.

6. A method for producing the laminate according to claim 1, comprising:

forming on the substrate by dry coating method or wet coating method the interlayer of at least one triazine compound selected from the group consisting of compounds of formula TN-1, compounds of formula TN-2 and compounds of formula TS, and forming on the interlayer by dry coating method or wet coating method the surface layer of the all fluorinated ether compound having a poly(oxyperfluoroalkylene) chain, and at least one of a hydrolyzable group bonded to a silicon atom and a hydroxy group bonded to a silicon atom.

7. The method according to claim 6, wherein the dry coating method is employed and the dry coating method comprises vacuum deposition.

8. The method according to claim 6, wherein the method of forming the interlayer is by the wet coating method and the wet coating method comprises applying a composition containing the at least one triazine compound and a liquid medium on the substrate, and removing the liquid medium from an obtained coating film containing the liquid medium, and the method of forming the surface layer is by the wet coating method and the wet coating method comprises applying a composition containing the fluorinated ether compound and a liquid medium to the interlayer, and removing the liquid medium from an obtained coating film containing the liquid medium.

\* \* \* \* \*